United States Patent [19]

Huebsch et al.

[11] E Re. 30,110

[45] Reissued Oct. 9, 1979

[54] FAIL-SAFE SAFETY CUT-OFF VALVE FOR A FLUID WELL

[76] Inventors: Donald L. Huebsch, 3716 Prestwick Dr., Los Angeles, Calif. 90027; Louis B. Paulos, 9616 Yolanda Ave., Northridge, Calif. 91324

[21] Appl. No.: 794,800

[22] Filed: May 9, 1977

Related U.S. Patent Documents

Reissue of:

[64] Patent No.: 4,002,202
Issued: Jan. 11, 1977
Appl. No.: 616,189
Filed: Sep. 24, 1975

[51] Int. Cl.[2] ..... E21B 43/00; F16K 31/06; F16K 17/34

[52] U.S. Cl. ..... 166/65 M; 166/330; 166/332; 251/139; 137/498; 137/521

[58] Field of Search ..... 251/139, 141; 166/65 R, 166/65 M, 332, 330; 137/498, 521

[56] References Cited

U.S. PATENT DOCUMENTS

| | | | |
|---|---|---|---|
| 3,007,672 | 11/1961 | Tischler | 251/139 |
| 3,032,111 | 5/1962 | Corley, Jr. et al. | 166/65 R |
| 3,321,177 | 5/1967 | Fendel et al. | 251/139 X |
| 3,731,742 | 5/1973 | Sizer | 166/65 M |
| 3,750,700 | 8/1973 | Ecuer | 137/498 |
| 3,833,015 | 9/1974 | Kneuer | 251/139 |

*Primary Examiner*—Arnold Rosenthal
*Attorney, Agent, or Firm*—Sellers and Brace

[57] ABSTRACT

A fail-safe sub-surface safety cut-off valve for fluid wells controllable from the surface and suitable for installation at substantially greater depths than prior constructions. The valve assembly is installable and retrievable via wire line technique and utilizes an electromagnetic means to operate either a flapper or a ball cut-off valve. The operating solenoid coil embraces a landing nipple portion of the tubing string and is outside the production flow. This solenoid supplies the power to open either type of cut-off valve and holds the latter open only so long as the solenoid is energized thereby providing surface control of the safety cut-off valve normally and assurance of closing of this valve in the event of power failure through accident or some catastrophe as well as automatic closure if flow velocity increases beyond a predetermined safe value.

38 Claims, 5 Drawing Figures

FIG. 1.
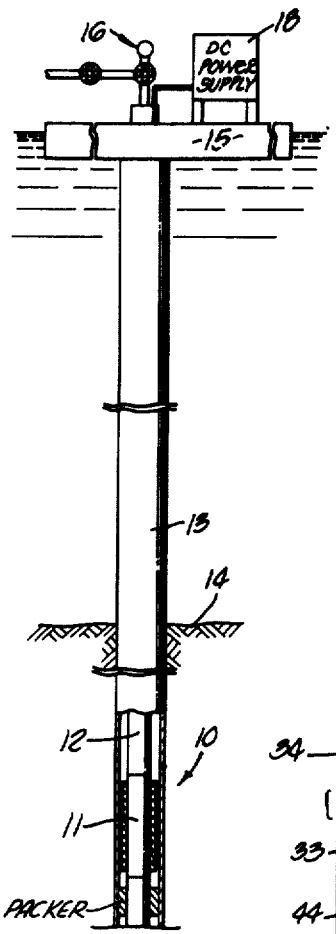
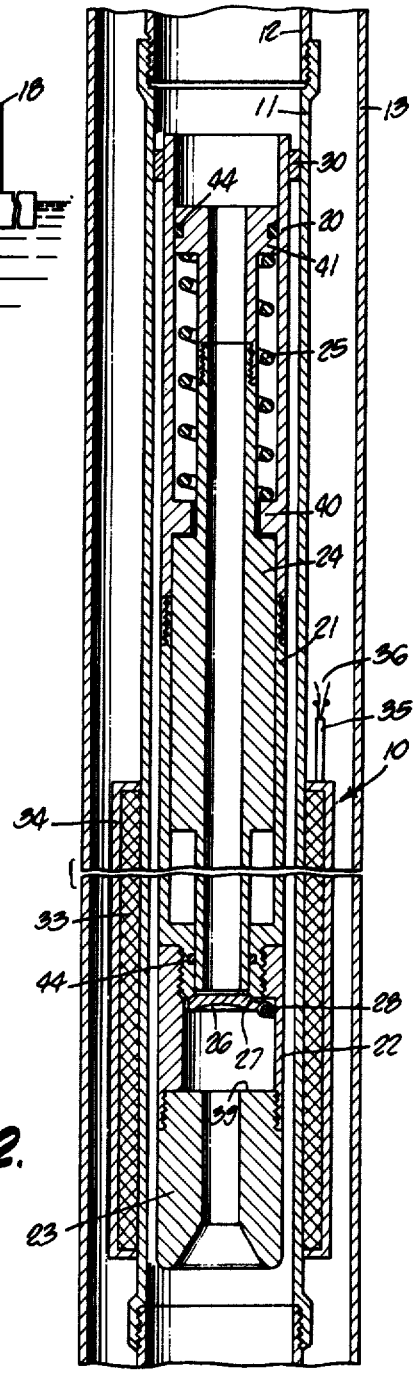
FIG. 2.
FIG. 3.
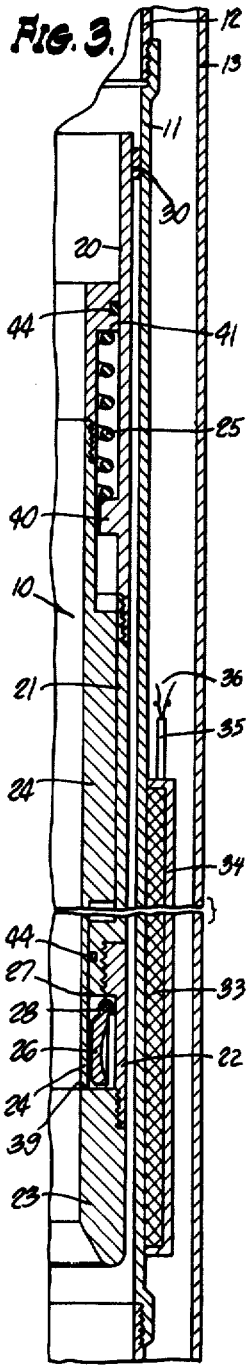

FAIL-SAFE SAFETY CUT-OFF VALVE FOR A FLUID WELL

Matter enclosed in heavy brackets [ ] appears in the original patent but forms no part of this reissue specification; matter printed in italics indicates the additions made by reissue.

This invention relates to a sub-surface safety cut-off valve, and more particularly to a fail-safe safety cut-off valve utilizing electromagnetic actuating means controllable from the surface.

It is critically essential that petroleum wells have suitable provision for protecting the well against certain hazards commonly encountered in the operation of such wells. Abnormal conditions can be encountered suddenly and without advance notice. Thus there may be a sudden release of undergrounding pressure causing the well to go wild and out of control. Even under normal operating conditions it is often desirable to interrupt flow at sub-surface depths.

To meet the foregoing and the like contingencies numerous cut-off valve constructions have been proposed heretofore incorporating the capability of responding to emergency conditions to interrupt flow. These various types are in widespread daily use but are subject to certain disadvantages and shortcomings avoided by this invention. One common type employs a flapper valve pivotally supported along the interior sidewall of the flow passage and held open by a protector tube so long as normal operating conditions prevail. Some safety valves of this type respond to an abnormal increase in the flow velocity to close automatically whereas others are held in open position hydraulically by static pressure means controlled from the ground surface. Another type of safety cut-off valve in use employs a rotary ball valve held in open position by hydraulic pressure controlled at the well head. Among the serious shortcomings of certain of these valves is the fact that one or more springs is relied upon to close the valve operating mechanism and these springs are required to operate an opposition to the static hydraulic head in the line employed to open the valve. For this reason it has been found impractical to utilize such valves at a depth in excess of about 500 feet. This is a highly objectionable and serious limitation on land based wells, and particularly as respects wells beneath the sea bed. Moreover prior safety cut-off valves lack the capability of control at will from ground level as well as the ability to close automatically in response to abnormally rapid flow.

To avoid the foregoing and other limitations and shortcomings of prior safety cut-off valve constructions, there is provided by this invention an improved safety cut-off valve having an electromagnetic operating mechanism controllable from the surface by power leads extending along the tubing annulus. The operating mechanism functions equally well to open either a flapper or ball-type valve. The cut-off valve assembly functions in a highly satisfactory manner at any desired depth, the valve-opening operation being facilitated at greater depths by equalizing the pressure on the upper side of the valve in accordance with well known technique. The valve assembly, with the exception of the solenoid coil sub-assembly, is installable and retrievable by wire line operating techniques. The solenoid coil must be energized to open the flow control member and to hold it open. If power fails for any reason or is deliberately cut off, spring means, acting alone or in cooperation with flow past the valve quickly closes the valve and positively prevents further flow. Additionally, both illustrative species of our improved safety cut-off valve close automatically if flow increases abnormally for any reason.

Accordingly, it is a primary object of the present invention to provide a sub-surface safety cut-off valve of the normally closed type having electro-mechanical means for opening and retaining the valve in open position so long as energized.

Another object of the invention is the provision of a fail-safe sub-surface safety cut-off valve for a petroleum well having electrically powered means for opening and retaining the same in open position.

Another object of the invention is the provision of a fail-safe cut-off valve for installation at substantially any selected depth and provided with surface-controlled electrically powered means for controlling operation of the valve rather than hydraulic pressure.

Another object of the invention is the provision of a sub-surface petroleum well safety cut-off valve embodying self-contained means for normally holding the same closed and having electrically powered means for retaining the valve open.

Another object of the invention is the provision of an oil well safety cut-off valve normally held open by surface-controlled electromagnetic means and which closes automatically in response to an abnormal increase in fluid flow past the valve.

These and other more specific objects will appear upon reading the following specification and claims and upon considering in connection therewith the attached drawing to which they relate.

Referring now to the drawing in which a preferred embodiment of the invention is illustrated:

FIG. 1 is a diagrammatic view, partly in cross-section, showing a petroleum well extending beneath the sea bed and equipped with an illustrative embodiment of the invention safety cut-off valve;

FIG. 2 is a longitudinal cross-sectional view on an enlarged scale showing a flapper valve embodiment of the invention in closed position;

FIG. 3 is a view similar to FIG. 2 taken along the right-hand half of FIG. 2 but showing the valve open;

Figure 4:
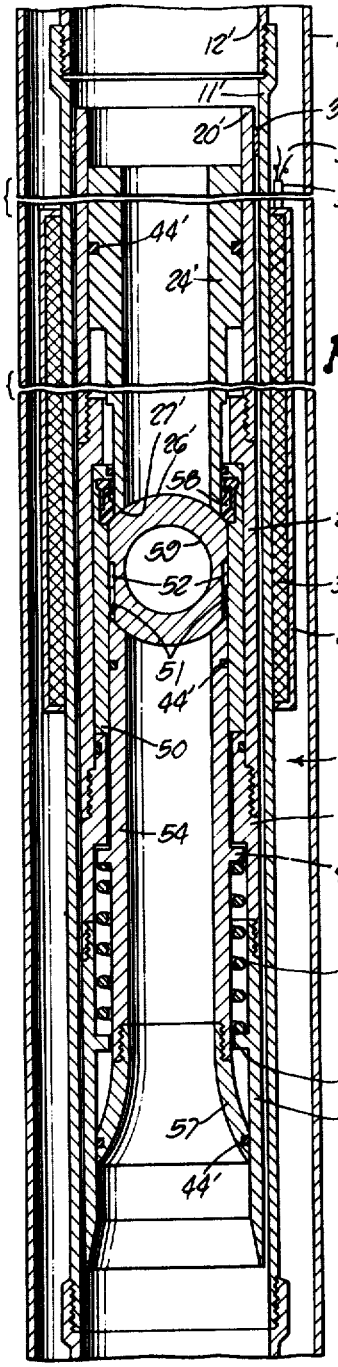
FIG. 4 is a view similar to FIG. 2 but showing a second embodiment utilizing a ball valve shown in closed position.

Referring initially more particularly to FIG. 1, there is shown a typical petroleum well having one embodiment of the invention safety cut-off valve designated generally 10 installed in a landing nipple 11 forming part of a tubing string 12 inside casing 13 extending through sea bed 14 from an operating platform 15 supported in any suitable manner at the water surface. The top of the wall casing is provided with the customary Christmas tree 16. Located on platform 15 is a d.c. power source 18 and suitable controls not shown and described more fully presently.

Referring now to FIGS. 2 and 3, the constructional details of the safety cut-off valve 10 will be described. The retrievable portion of the cut-off valve assembly comprises a tubular housing formed in several coaxial sections threaded to one another including an upper section 20, to midsections 21, 22, and an inlet section 23. Slidably supported in this housing is a tubular armature 24 normally urged upwardly by a compression spring 25 thereby permitting flapper valve 26 to close against seat 27. Valve 26 is pivotally supported on housing member 22 by a pivot pin 28 and is biased to closed position by a suitable spring, not shown.

The tubular housing of the cut-off valve is detachably supported within landing nipple 11 of the tubing string by a fluid-tight seal and coupling assembly 30 of well known construction. For example, this coupling may be of the type in which the portion fixed to the upper end of the tubular housing can be securely locked assembled to the landing nipple by a bayonet type connector which is readily engaged and disengaged by a conventional wire line tool lowered through tubing string 12.

Surrounding the lower end of landing nipple 11 is a solenoid coil 33 enclosed in a casing 34 of excellent magnetic material having high permeability. Extending from the top of this solenoid is a cable 35 enclosing electrical conductors 36 connected at the well head to the d.c. power supply 18. As is clearly evident from the drawings, the solenoid and its casing are sealed to the exterior of the landing nipple in the annulus between the tubing string 12 and the well casing 13.

Certain components of the assembly embraced by the solenoid coil such as tubular members 11, 21, and 22, are of suitable non-magnetic material whereas the armature or plunger 24 and the tubular fitting 23 forming the inlet end of the valve housing and the solenoid coil casing 34 are formed of magnetic material and cooperate with the solenoid coil to provide an excellent low reluctance flux path for the flux generated by coil 33 when energized. The upper end 39 of inlet fitting 23 forms a stationary pole piece against which the lower end of armature 24 is firmly held so long as the solenoid coil 33 is energized. When this coil is not energized the compression spring 25 cooperates with flange 40 of the housing section 20 and with the flanged upper end 41 of the armature to elevate this armature until its lower end is withdrawn vertically above the valve seat 27 allowing the flapper cut-off valve 26 to close. This flapper valve 26 may be lightly biased toward closed position by a torsion spring not shown. It will be noted that the lower end of the armature, when seated against surface 39 of the pole piece, not only acts to hold valve 26 fully open but provides a protective barrier isolating the valve from conduit with the well flow. Of equal importance is the fact that the armature prevents any portion of the well flow coming in contact with the valve and tending to pivot the valve toward closed position.

Normally and with the solenoid coil de-energized spring 25 holds the tubular armature 24 elevated against stop flange 40 wherein valve 26 is closed against seat 27. Before opening the valve it is necessary to equalize the pressure above to that below the valve which is accomplished from the operating platform 15 in well known manner by operating valves and equipment to pressurize the tubing string until pressure equalization is obtained. Thereupon the operator restores the power supply to solenoid coil 33 via cable 35 and leads 36. The resulting flux generated by this coil is confined to casing 34, armature 24, and the tubular pole piece 23 at the lower end of the valve housing. This highly concentrated flux is effective in shifting the armature 24 axially downwardly until its lower end contacts the upper end of pole piece 39. As the armature moves downwardly, spring 25 is compressed and valve 26 is pivoted counterclockwise to the open position through contact with the lower end of the armature and is held fully open until the solenoid is de-energized. Oil seals 44 embracing the opposite ends of armature 24 prevent fluid and foreign matter from entering the chamber housing spring 25 and the chamber above the valve seat. These seals prevent the well fluid from entering these two chambers which contain only air. Each is sufficiently large relative to the axial movement of the armature to permit the latter to operate without need for increasing the air pressure in an amount interfering with operation of the valve. As soon as the valve is fully open, the operator may discontinue pressurizing the upper end of the tubing string and open the valves controlling production flow from the well. Flow takes place in the normal manner through the production flow passage which includes the tubular armature and the inlet and outlet passages at the opposite ends of the tubular valve housing members 20–23.

The safety cut-off valve may be closed either by cutting off the power to the solenoid coil or by an abnormal increase in the flow through the valve. If the power is cut off, spring 25 closes the valve. However, the valve will also close if the pressure differential at the opposite ends of the armature 24 exceeds a predetermined value. For example, flow at a rate above that for which a particular cut-off valve is designed will increase the friction flow forces along the length of armature member 24. These forces plus the energy stored in spring 25 will exceed the holding power of the solenoid coil on armature 24 with the result that the armature will move automatically to its elevated position thereby allowing valve 26 to close. The pressure differential effective to cause the valve to close may be adjusted at will from ground level by varying the direct current voltage applied to the solenoid coil by any suitable means such as a voltage divider, potentiometer or the like, not shown.

Figure 5:
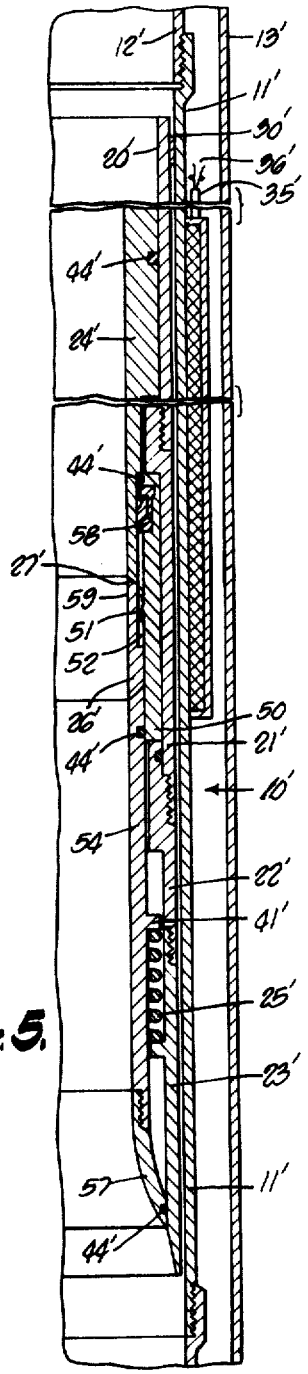
FIG. 5 is a fragmentary cross-sectional view similar to FIG. 4 but showing the position of the parts with the ball valve in open position.

Referring now to FIGS. 4 and 5, there is shown a second preferred embodiment of the invention utilizing a ball-type cut-off valve element arranged to be operated between its closed and open positions electromagnetically. The same or similar parts of the second embodiment are designated by the same reference characters employed above in connection with FIGS. 1–3 but distinguished therefrom by the addition of a prime. In all major respects these two embodiments are constructed in the same general manner and operate similarly with the exception that the ball valve element 26′ is constructed and mounted quite differently from the flapper valve 26. Also in the interests of brevity the construction details of the valve cage supporting ball valve 26′ have not been shown in full since these components are well known and fully disclosed in Reissue Pat. No. 28,131 granted to Leutwyler on Aug. 20, 1974. Valve 26′ is supported in a two-part cylindrical valve cage 50 embracing this ball valve and having a pair of trunnions 51 projecting toward one another and into V-shaped notches 52 formed in the diametrically opposed sides of valve 26′. The axes of trunnions 51 are offset below the center of ball valve 26′ and so arranged as to rotate valve 26′ through 90° about a horizontal axis as the tubular armature 24′ of the valve operating mechanism reciprocates between its fully retracted and extended positions by solenoid coil 33′. It will be understood that this operating range of movement of the armature 24′ is similar to the range of movement of the armature 24 in FIGS. 2 and 3. The valve seat 27′ is located at the lower end of armature 24' and bears directly against the upper surface of the ball. The ball is urged to rotate upwardly toward seat 27' by an underlying tube 54 having a loose sliding fit with the lower half of the valve cage 50 and biased against the underside of the ball by the coil compression spring 25'. The upper end of this spring bears against a radial flange 41' surrounding tube 54 whereas its lower end rests on flanges 40' projecting inwardly from housing member 23'. The lower end of tube 54 is provided with a downwardly and outwardly flaring inlet tube 57 having a sliding fit with the interior sidewall of housing member 23'.

Cooperating with valve seat 27' and the upper side of ball 26' is a sealing ring 58 of any suitable material.

Of importance is the fact that certain components are formed of excellent magnetic material whereas other parts are made of non-magnetic material. Those parts made of good magnetic material comprise the solenoid casing 34', the tubular armature 24', and preferably ball valve 26'. The other components 11', 20', 21', 50, 54 embraced by the solenoid coil are preferably made of non-magnetic material.

Normally, with the solenoid coil 33' de-energized spring 25' urges the tubular inlet members 54, 57, ball 26' and armature 24' upwardly along the interior of the tubular housing 20', 21', 22' and 23'. Valve cage 50 will be understood as held stationary between shoulder components of 21' and 22'. When the parts are positioned as illustrated in FIG. 4, ball 26' is held firmly seated in closed position against seat 27' and the seat sealing ring assembly 58.

To open the valve, the operator proceeds much in the same manner described above for the first embodiment. Usually there is a pressure differential across the valve when closed and this differential should be equalized by pressurizing the upper end of the tubing string 12' in well known manner. This having been done, the operator energizes the solenoid coil to provide a powerful circuit of flux through the solenoid casing 34', tubular armature 24', ball valve 26' and the adjacent lower end of the solenoid casing. When first energized, valve 26' is at an elevation appreciably above the lower end of solenoid casing 34'. The magnetic force provided by this flux tends to centralize the magnetic armature and ball valve between the opposite ends of the solenoid coil and to close the gap between the lower end of the solenoid casing and the lower portion of the ball 26'. Accordingly, the armature and ball along with the non-magnetic inlet tube 54 are moved axially downwardly compressing spring 25'. During the downward movement the trunnions 51 cooperate with V-shaped notches 52 in the sides of ball 26' to rotate this ball 90° to its open position wherein its diametric bore 59 is axially aligned with the flow passages through inlet tube 54 and armature 24'.

Oil seals 44' prevent fluid and foreign matter from entering the air-filled chamber housing spring 25' and the annular air chamber above valve seat 27'.

The valve assembly now remains open to provide unobstructed flow so long as the solenoid coil remains energized or until the pressure drop or differential across the cut-off valve exceeds a predetermined value in which event the valve closes automatically as explained in detail above in connection with the valve illustrated in FIGS. 1 to 3.

While the particular fail-safe safety cut-off valve for a fluid well herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. [A] *That improvement in a fluid well tubing string which comprises: a* fail-safe safety cut-off valve, [assembly suitable for use deeply submerged and supported coaxially of the tubing string of a fluid well comprising:] an open-ended tubular housing of non-magnetic material [forming a tubular portion of said tubing string and supporting a solenoid coil substantially embraced except on its interior side by magnetic material,] *positioned between the opposite ends and forming part of said tubing string, a solenoid coil surrounding said tubular housing,* a tubular armature of magnetic material mounted within said housing and reciprocal between extended and retracted positions axially of said tubular housing and of said solenoid coil [and having cut-off valve means operatively associted therewith, spring means biasing said valve means closed and said armature to said extended position when said solenoid coil is de-energized, said solenoid coil, when energized, being effective to shift said armature to said retracted position and to open said cut-off valve, and means providing a fluid seal between the exterior of said armature and the interior of said tubular housing], *means positioned to engage and restrain axial movement of said armature when said armature reaches the retracted position thereof, cut-off valve means and valve seat means operatively associated with said tubular armature each within and independent of said tubular housing, said valve means, when open, being positioned out of the axial flow path of fluid through said cut-off valve, means biasing said valve means closed against said valve seat means and biasing said armature to said extended position when said solenoid coil is de-energized, said solenoid coil, when energized, being effective to shift said armature into engagement with said movement restraining means and to open said cut-off valve means, and means interconnecting and providing a fluid seal between said valve seat means and the interior of said tubular housing.*

2. [A valve assembly as] *That improvement* defined in claim 1 characterized in [the provision of] *that said movement restraining means for said armature includes a* tubular pole piece of magnetic material fixedly supported within [the tubular portion of the tubing string] *said tubular housing* in alignment with said armature and providing a stop for the retracted position of said armature when said solenoid coil is energized.

3. [A valve assembly as] *That improvement* defined in claim [1] *2* characterized in that said tubular pole piece is located [below the lower] *adjacent one* end of said armature [and radially opposite the lower end of said armature] and radially opposite the [lower] *contiguous* end of said [magnetic material embracing said] solenoid coil.

4. [A valve assembly as] *That improvement* defined in claim [3] *1* characterized in that said valve means is [positioned adjacent the lower end of said armature and is] pivotable through approximately 90° about a generally horizontal axis.

5. [A valve assembly as] *That improvement* defined in claim 4 characterized in the provision of means for *movably* supporting said valve means [on said valve assembly] *within said tubular housing* independently of said armature.

6. [A valve assembly as] *That improvement* defined in claim 4 characterized in the provision of means movably supporting said valve means between the opposite ends of said armature *when in said retracted position thereof* for pivotal movement about an axis extending transversely of said armature.

7. [A valve assembly as] *That improvement* defined in claim 4 characterized in that said valve means comprises a ball having a flow passage diametrically therethrough, and means operatively connected to said ball for rotating said ball through a 90° arc between the closed and open positions thereof as said armature is moved from its [upper] extended position [and] *to* its [lower closed] *retracted* position in response to energization of said solenoid coil.

8. [A valve assembly as] *That improvement* defined in claim 7 characterized in that said armature includes axially aligned upper and lower portions the adjacent ends of which are disposed opposite upper and lower surfaces of said [sphere] *ball.*

9. [A] *That improvement in a fluid well tubing string which comprises: a* fail-safe safety cut-off valve [assembly] for sub-surface installation along a *non-magnetic* section of [a fluid well] *said* tubing string, [formed of non-magnetic material] a solenoid coil [wound about the exterior of] *encircling* said non-magnetic section, [encased on its exterior and ends by thick-walled magnetic material] a tubular armature of magnetic material reciprocally supported within and lengthwise of said non-magnetic section [of said tubing string and including means providing a fluid-tight seal between the exterior of said armature and the interior of said non-magnetic section of said tubing string, a tubular pole piece of magnetic material fixed to said non-magnetic section radially inwardly of the lower end of said solenoid coil and adjacent to and aligned with the lower end of said armature, valve means adjacent the lower end of said armature movable between open and closed positions to control flow through said armature, spring means urging said armature to the elevated extended position thereof spaced above said pole piece with said valve means closed when said coil is de-energized, and said coil being operable when energized to move said armature axially toward said pole piece and to hold said valve means open so long as said coil remains energized], *tubular pole piece means of magnetic material within said non-magnetic section radially inwardly of one end of said solenoid coil and adjacent to and aligned with the contiguous end of said armature and including valve seat means supported crosswise of said non-magnetic section, spring-biased valve means movable between open and closed positions relative to said valve seat means to control flow through said armature, spring means biasing said armature to the extended position thereof spaced from said pole piece with said valve means closed when said coil is de-energized, and said solenoid coil being operable when energized to move said armature axially toward said pole piece and to hold said valve means open.*

10. [A valve assembly as] *That improvement* defined in claim 9 characterized in the provision of a tubular housing of non-magnetic material embracing said armature, said tubular pole piece, said spring means and said valve means and holding the same operatively assembled to one another as a unitary sub-assembly, and separable coupling means carried in part by said non-magnetic section and in part by said *unitary* sub-assembly for holding said *unitary* sub-assembly detachably connected to said non-magnetic section of said flow tube.

11. [A valve assembly as] *That improvement* defined in claim 9 characterized in the provision of electrical leads for said solenoid coil which extend between the entrance to [the oil] *said fluid* well and said coil along the exterior of said tubing string.

12. [A valve assembly as] *That improvement* defined in claim 9 characterized in that said valve means comprises a flapper valve pivoted to [one of said non-magnetic tubes in an area] *said valve seat means* along one lateral side of the [lower] *contiguous* end of said armature.

13. [A valve assembly as] *That improvement* defined in claim [9] *18* characterized in that said valve means comprises a ball rotatably supported crosswise of said armature and having a flow passage diametrically thereof, and means for rotating said ball about a horizontal axis between open and closed position as said armature reciprocates between the extended and retracted positions thereof upon energization of said solenoid coil.

14. [A valve assembly as] *That improvement* defined in claim 10 characterized in the provision of electrical leads extending from said *solenoid* coil to the well head along the exterior of said tubing string, and said *solenoid* coil being effective to hold said *spring-biased* valve means open [in opposition to said spring means] only so long as said coil remains energized.

15. [A valve assembly as] *That improvement* defined in claim 1 characterized in that said solenoid coil is effective to hold said tubular armature in position to hold said [cut-off] valve means in open position until the flow velocity through said tubular armature and the resulting friction losses increase beyond a predetermined value exceeding the magnetic holding power of said solenoid coil whereupon said [spring] *valve* means [is effective to close said cut-off valve] *closes.*

16. [A valve assembly as] *That improvement* defined in claim [15] *9* characterized in the provision of means remote from said cut-off valve for varying the voltage applied to said solenoid coil for varying the holding power of said solenoid coil.

17. [A valve assembly as] *That improvement* defined in claim 15 characterized in the provision of means remote from said cut-off valve to adjust the voltage[s] applied to said solenoid coil to energize the same thereby to adjust the holding power of said coil on said tubular armature and whereby said [cut-off] valve *means* will automatically close when the pressure differential across said [cut-off] valve *means* reaches a different predetermined value.

*18. A fail-safe safety cut-off valve for a fluid well tubing string comprising: a tubular housing insertable between the adjacent ends of contiguous sections of a conventional tubing string, a cut-off valve sub-assembly embraced by and mounted within said tubular housing and including coupling means interiorly of said tubular housing holding said valve sub-assembly detachably coupled as a unit to said tubular housing and, when uncoupled, permitting withdrawal of said valve sub-assembly as a unit through a tubing string, said valve sub-assembly including valve seat means and pivoting valve means biased toward closed position thereagainst, solenoid means for opening and retaining said valve means open comprising tubular armature means mounted within and reciprocal axially of said housing between an extended position wherein said valve means is closed on said valve seat means and a retracted position wherein said valve means is held open, means for shifting said armature means to said extended position, and sole-*

*noid coil means operable when energized to shift said armature means to said retracted position to open and retain said valve means in open position.*

*19. A cut-off valve as defined in claim 18 characterized in that said solenoid coil means encircles said tubular housing along portions thereof to either axial side of said valve means.*

*20. A cut-off valve as defined in claim 18 characterized in that said means for shifting said armature means to the extended position thereof comprises spring means.*

*21. A cut-off valve as defined in claim 18 characterized in the provision of tubular pole-piece means of magnetic material spaced axially from the flow inlet to said valve seat means with the one end of said tubular pole-piece means positioned to engage and provide a stop for the adjacent end of said armature means when said solenoid coil means is energized.*

*22. A cut-off valve as defined in claim 18 characterized in that said cut-off valve sub-assembly includes means located interiorly of said tubular housing for detachably coupling said cut-off valve sub-assembly to said tubular housing thereby to permit installation and removal of said sub-assembly as a unit through an installed tubing string.*

*23. A cut-off valve as defined in claim 18 characterized in that said valve means comprises a flapper valve pivotally supported near one edge of said valve seat means.*

*24. A cut-off valve as defined in claim 18 characterized in that said tubular armature means is reciprocal through said valve seat means while moving between the extended and retracted positions thereof and is effective to isolate said valve seat means from contact with flowing well fluid while holding said valve means open.*

*25. A cut-off valve as defined in claim 23 characterized in that said flapper valve is supported exteriorly of said tubular armature means so long as said armature means is in the retracted position thereof.*

*26. A cut-off valve as defined in claim 21 characterized in that said valve means is movably supported between said valve seat means and said pole piece means and is movable to an open position along one exterior side of said tubular armature means so long as one end of said armature means engages the adjacent end of said pole piece means.*

*27. A cut-off valve as defined in claim 25 characterized in that said valve means comprises a flapper valve pivotable between a closed position transversely of said tubing string and and open position lengthwise of said tubing string and along the exterior of said armature means.*

*28. A cut-off valve as defined in claim 21 characterized in that said armature means is reciprocal through said valve seat means into engagement with said pole piece means when said solenoid means is energized and is operable to open said valve means to a position exteriorly of said armature means while moving toward said pole piece means.*

*29. A cut-off valve as defined in claim 27 characterized in that said tubular armature means cooperates with said pole piece means when engaged therewith to isolate said valve means and said valve seat means from flowing well fluid.*

*30. A cut-off valve as defined in claim 21 characterized in that said tubular pole piece means and said tubular armature means cooperate in the retracted position of said armature means to provide an unobstructed tubular flow passage past said valve means.*

*31. A cut-off valve as defined in claim 29 characterized in that said valve means and said valve seat means are isolated from flowing well fluid when said solenoid means is energized to hold said armature means retracted, and said armature means being operable while moving to the retracted position thereof to open said valve means.*

*32. A fail-safe safety cut-off valve for a fluid well comprising: a landing nipple insertable between the adjacent ends of contiguous sections of a tubing string, a cut-off valve sub-assembly embraced by said landing nipple, separable coupling means manipulatable from the interior of said sub-assembly while said safety cut-off valve is installed in a tubing string thereby detachably supporting said valve sub-assembly within said landing nipple for withdrawal therefrom through an installed tubing string, said valve sub-assembly including valve seat means and pivoting valve means biased toward closed position against said valve seat means, tubular armature means reciprocally supported within and lengthwise of said landing nipple normally spring-biased to the extended position thereof, and including means operable to open said valve means while moving to the retracted position thereof, solenoid means carried by said landing nipple and operable when energized to move said armature means to the retracted position thereof and to hold said valve means open.*

*33. A safety cut-off valve as defined in claim 32 characterized in the provision of readily separable coupling means for holding said cut-off valve sub-assembly detachably assembled to the interior of said landing nipple.*

*34. That improvement defined in claim 1 characterized in that said valve means comprises a ball having a diametric flow passage therethrough, and means operatively connected to said ball for rotating said ball between closed and open positions in response to movement of said armature from its extended position to its restrained retracted position upon energization of said solenoid coil.*

*35. A fail-safe safety cut-off valve for a fluid well comprising: a tubular housing insertable between the adjacent ends of contiguous sections of a conventional tubing string, a cut-off valve sub-assembly embraced by and mounted within said tubular housing including valve seat means and pivoting valve means biased toward closed position thereagainst, said cut-off valve sub-assembly including means for holding the same detachably coupled to said tubular housing for installation therein and withdrawal therefrom while said tubular housing remains assembled between the opposite ends of a tubing string, solenoid means for opening and retaining said valve means open comprising tubular armature means mounted within and reciprocal axially of said housing between an extended position wherein said valve means is closed on said valve seat means and a retracted position wherein said valve means is held open, means for shifting said armature means into engagement with armature movement restraining means when said solenoid means is energized, and solenoid coil means operable when energized to shift said armature means to said retracted position to open and retain said valve means in open position.*

*36. A safety cut-off valve as defined in claim 35 characterized in that said tubular housing is imperforate and without electrical conductors passing therethrough.*

*37. A safety cut-off valve as defined in claim 36 characterized in that said valve means includes a ball having a fluid flow passage therethrough and including means for pivoting said ball between the open and closed positions thereof as said tubular armature means moves away from the retracted to the extended position thereof.*

*38. That improvement in a fluid well tubing string which comprises: a fail-safe safety cut-off valve, an open-ended tubular housing of non-magnetic material positioned be-*

*tween the opposite ends and forming part of said tubing string, a solenoid coil surrounding said tubular housing, a tubular armature of magnetic material mounted within said housing and reciprocal between extended and retracted positions axially of said tubular housing and of said solenoid coil, cut-off valve means and valve seat means operatively associated with said tubular armature and one of which means is movably supported independently of said armature, means biasing said valve means closed against said valve seat means and biasing said armature to said extended position when said solenoid coil is de-energized, said solenoid coil, when energized, being effective to shift said armature to said retracted position and to open said cut-off valve means, and means interconnecting and providing a fluid seal between said valve seat means and the interior of said tubular housing.*

* * * * *